(12) United States Patent
Liaw

(10) Patent No.: US 6,718,638 B2
(45) Date of Patent: Apr. 13, 2004

(54) COAXIAL CABLE STRIPPER

(76) Inventor: Gwo-Jiang Liaw, No. 16, Lane 199, San Chung St., Shu Lin City, Taipei Hsien (TW)

( * ) Notice: Subject to any disclaimer, the term of this patent is extended or adjusted under 35 U.S.C. 154(b) by 59 days.

(21) Appl. No.: 10/211,323

(22) Filed: Aug. 5, 2002

(65) Prior Publication Data

US 2004/0020054 A1 Feb. 5, 2004

(51) Int. Cl.⁷ ................................................ H02G 1/12
(52) U.S. Cl. .......................... 30/90.7; 30/90.1; 81/9.4; 81/9.44
(58) Field of Search ............... 30/90.4, 90.6, 30/90.7, 90.8, 90.9, 91.1, 91.2, 90.1, 92, 93, 94; 81/9.4, 9.44

(56) References Cited

U.S. PATENT DOCUMENTS

| | | | | |
|---|---|---|---|---|
| 4,625,386 A | * | 12/1986 | Bieganski | 29/566.4 |
| 4,829,671 A | * | 5/1989 | Cheng | 30/90.1 |
| 4,945,636 A | * | 8/1990 | Takizawa | 30/91.2 |
| 4,953,428 A | * | 9/1990 | Commes | 81/9.4 |
| 5,036,734 A | * | 8/1991 | Morrow | 81/9.44 |
| 6,128,976 A | * | 10/2000 | Tarpill | 81/9.44 |
| 6,253,641 B1 | * | 7/2001 | Tarpill | 81/9.44 |

* cited by examiner

*Primary Examiner*—Hwei-Siu Payer
(74) *Attorney, Agent, or Firm*—Browdy and Neimark, P.L.L.C.

(57) ABSTRACT

A coaxial cable stripper includes an upper lid, a base, a blade seat, a lower lid, and a blade rotation rod. In use, the user's finger presses the upper lid to open the front end of the stripper. The cable is placed on the recess of the base. Then, the upper lid is released and the front end of the stripper close and grip the cable. Next, the screw at the bottom of the base is adjusted to control the spring force of the spring so as to force the blade to cut deep into the inner insulation layer to the central conductive core. Next, the screw at the blade body hole is adjusted to control the cutting depth of the blade body so as to force the blade to cut into the outer sheath of the cable. Then the inner insulation layer and the outer sheath can be cut.

10 Claims, 9 Drawing Sheets

COAXIAL CABLE STRIPPER

BACKGROUND OF THE INVENTION

1. Field of the Invention

The present invention relates to a coaxial cable stripper and in particular, a coaxial cable stripper suited for stripping inner insulating layers and outer sheaths of coaxial cables made of different materials and having various diameters by adjusting an adjusting screw.

2. Description of the Prior Art

It is well known in the art that when connecting coaxial cables, inner insulating layers and outer sheaths of coaxial cables are stripped off in advance for exposing a proper length of the central conductive cores, and at the same time, a proper length of the inner insulating layers are also exposed by stripping off the covering sheaths for the connection with associated connectors. This job is typically implemented, and accomplished at one time, by using coaxial cable stripping tools manipulated by an engineer's hand. Referring to FIG. 1, one of such coaxial cable stripping tools is disclosed in Taiwan Patent Publication Number 345,341, in which the coaxial cable stripper comprises an upper body 1, a lower body 2, a spring 3, and a blade seat 4. The upper body 1 and the lower body 2 are pivotally connected to each other by using a pivot pin 10. The spring 3 is disposed between the upper body 1 and the lower body 2 to urge the front end of the upper body 1 normally gripping the front end of the lower body 2. A semi-circular recess 11 and an associated recess 20 are provided on the front ends of the upper body 1 and the lower body 2 respectively for holding a cable. At the front end of the lower body 2 there is provided installation spacing 21 for accommodating the blade seat 4. As illustrated, a buckling recess 22 is provided at the inner bottom of the lower body 2 and two parallel rail slots 23 are formed on inner sidewalls of the lower body 2 at the installation spacing 21. At one end of each of the two parallel rail slots 23 is positioning protrusion 24. At the top surface of the blade seat 4 there is provided a recess 40 with multiple blade slots 41 thereon for receiving blades 42. At two opposite sides of the blade seat 4 there are two parallel rail strips 43 each of which corresponds to each of the two parallel rail slots 23 on inner sidewalls of the lower body 2. A pin hole 44 is provided at the rear side of the blade seat 4. The blade seat 4 further comprises a base 45 having a pin 46 thereon. When assembling, the pin 46 passes through the pin hole 44. A buckling member 47, which protrudes from the rear side of the base 45, engages with the buckling recess 22 of the lower body 2. The rear end of the lower body 2 defines a cylindrical opening 25. When a uses needs to strip a coaxial cable, he or she disposes the coaxial cable on the recess 40 of the blade seat 4. The coaxial cable is tightly gripped by the semi-circular recess 11 that is urged by the spring 3. Then, the user inserts his finger (not shown) into the cylindrical opening 25 at the rear end of the lower body 2 and rotates the stripping tool, thereby cutting the covering of the cable.

However, there are several shortcomings associated with the above-mentioned prior art coaxial cable stripping tool. For example, since spring force exerted on the cable surface is a constant force, the prior art coaxial cable stripping tool is only suited for some coaxial cables which are made of certain soft materials according to the strength of the spring 3. To some "hard" cables, which have a covering made of hard materials, the blades installed on the blade seat 4 cannot cut through the insulation layer of the cable. Further, to strip off a desired length of the covering of the cable, the inter-blade position is frequently changed and is limited by the number and dimension of the blade seat 4. In addition, the cutting is implemented only along radial direction of the cable.

Accordingly, there is a strong need for an improved stripping device which is user-friendly, efficient and have good reliability.

SUMMARY OF THE INVENTION

The main objective of the invention is to provide an improved coaxial cable stripper to solve the above-mentioned problems.

In accordance with the present invention, a coaxial cable stripper is provided. The coaxial cable stripper includes an upper lid having a recess at its front end; a base pivotally connected with the upper lid, the base having a cylindrical pole protruding from inside sidewalls of the base, a spring being installed in the cylindrical pole, a screw being installed at the bottom of the spring, the screw being connected to the bottom of the base, the upper end of the spring abutting upon the upper lid so that the front ends of the base and the upper lid is closed, the front end of the base comprising blade seat part and blade body part, wherein at the top surface of the blade seat part there is provided a protruding rail, and at the top surface of the blade body part there is provided a recess having a blade hole thereon, and wherein the recess on the top surface of the blade body part corresponds to the recess on the upper lid; a blade seat movably installed on the blade seat part of the base, the blade seat having a recessed groove at its bottom corresponding to the protruding rail on the blade seat part of the base, wherein recess is provided on the top surface of the blade seat corresponding to the recess on the upper lid, and positioning piece and blade are installed thereon; a lower lid connected to the front end of the base and having a blade body hole thereon, wherein screw is disposed at the bottom of the blade body hole for adjusting the cutting depth of the blade body; and a blade rotation rod clipped between the base and the lower lid, one end of the blade rotation rod being connected with the blade body, which is connected to a blade, wherein the blade is inserted into the blade hole on the blade body part of the base, an engaging block is disposed at the bottom of the blade body, which is embedded into the blade rotation rod and pivotally connected with the blade body hole of the lower lid.

Other objects, advantages and novel features of the invention will become more clearly and readily apparent from the following detailed description when taken in conjunction with the accompanying drawings.

DETAILED DESCRIPTION OF THE PREFERRED EMBODIMENT

Figure 1:
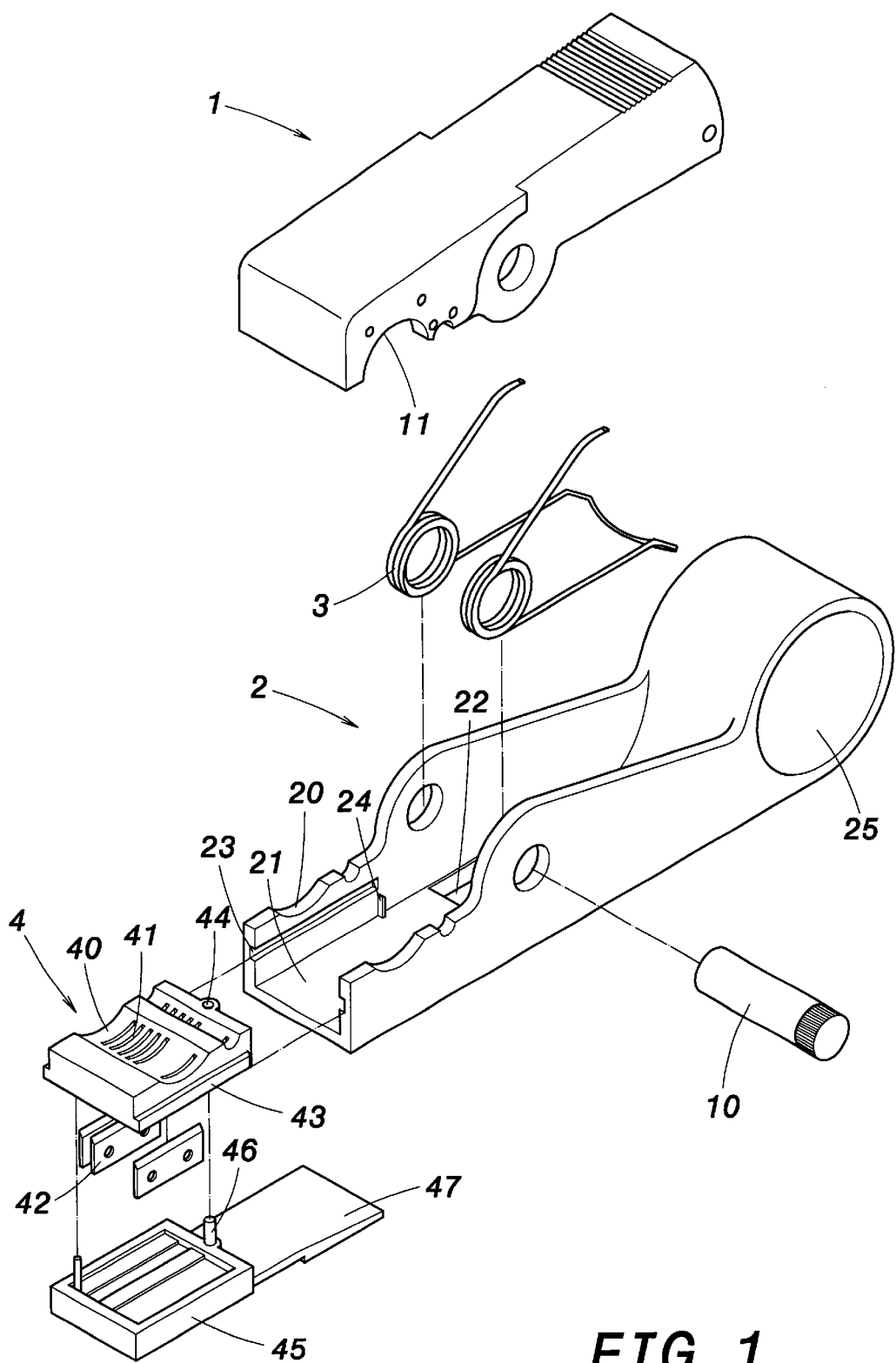
FIG. 1 is an exploded diagram of a prior art coaxial cable stripper.
Figure 2:
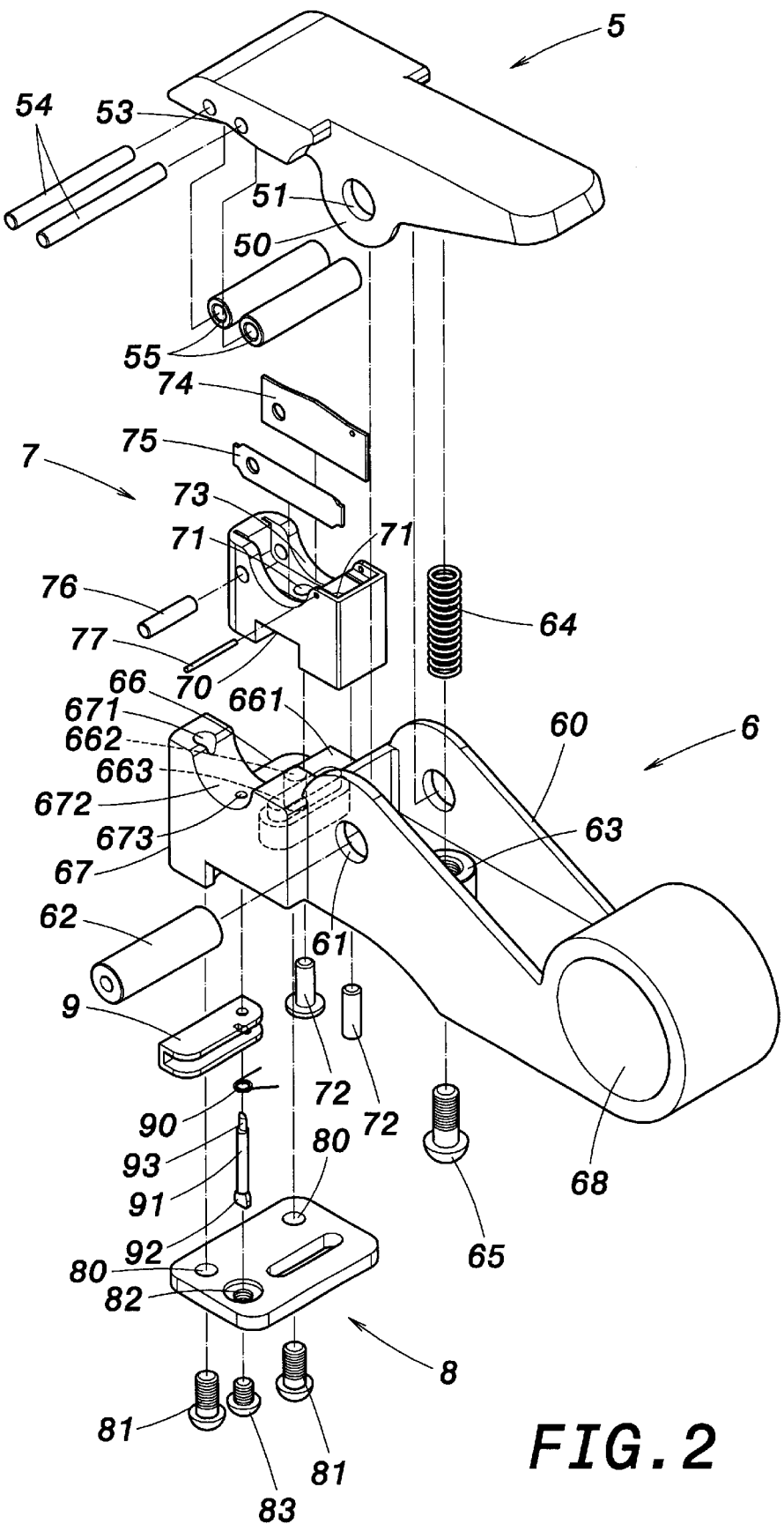
FIG. 2 is an exploded diagram of a coaxial cable stripper of this invention.
Figure 3:
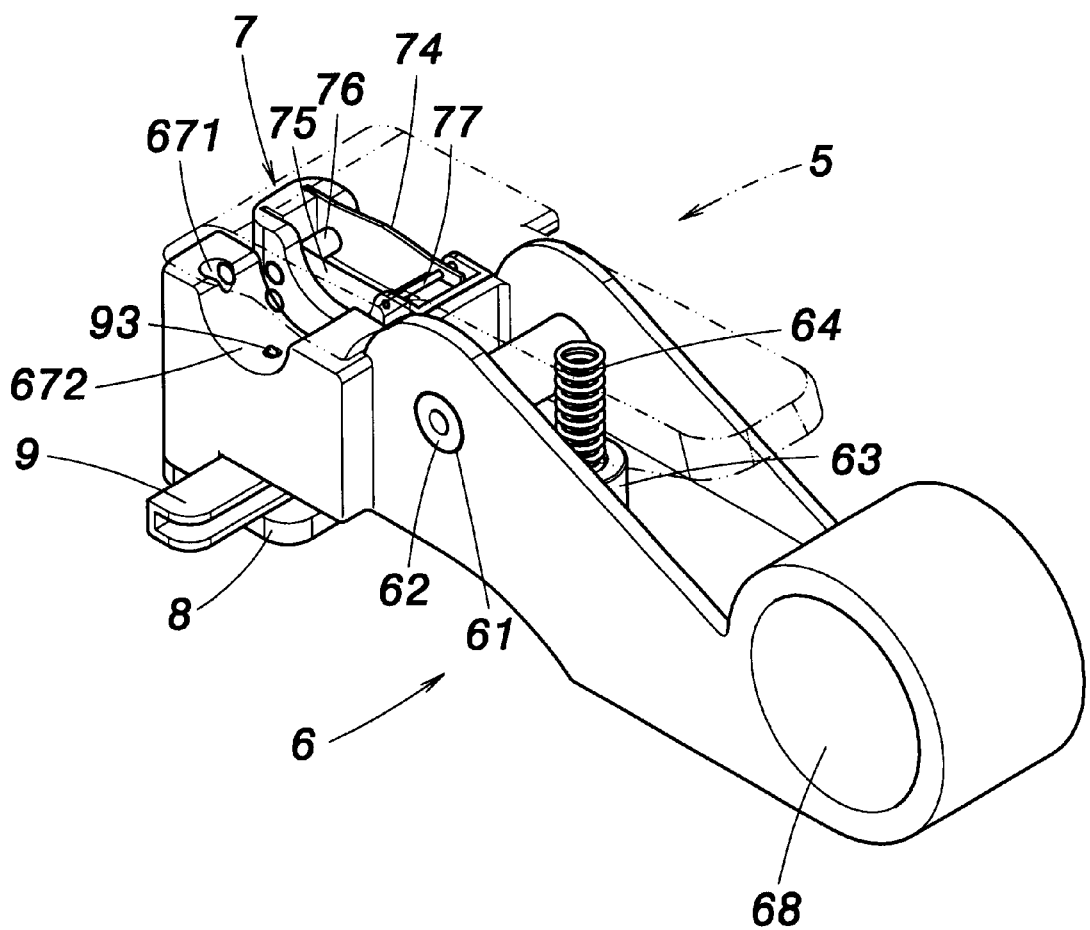
FIG. 3 is a perspective view of this invention.
Figure 4:
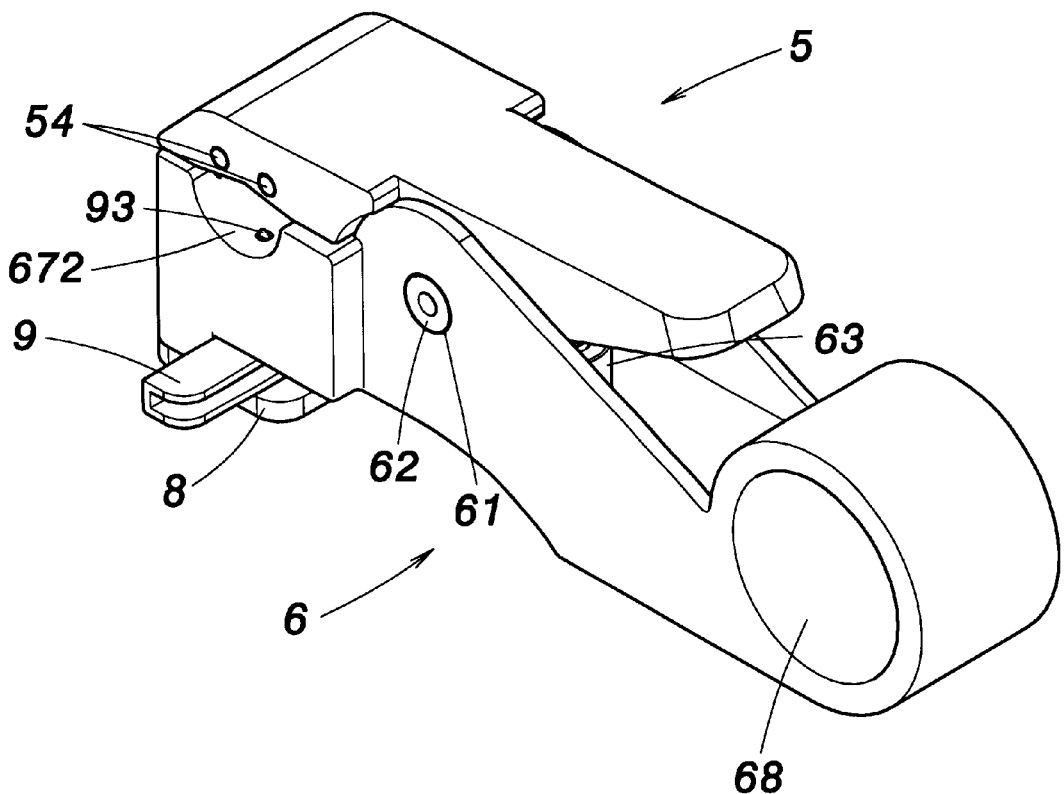
FIG. 4 is a perspective view of this invention, when assembly.

Please refer to FIG. 2 through FIG. 5. The present invention is directed to an improved coaxial cable stripper comprising an upper lid 5, a base 6, a blade seat 7, a lower lid 8, and a blade rotation rod 9.

Figure 5:
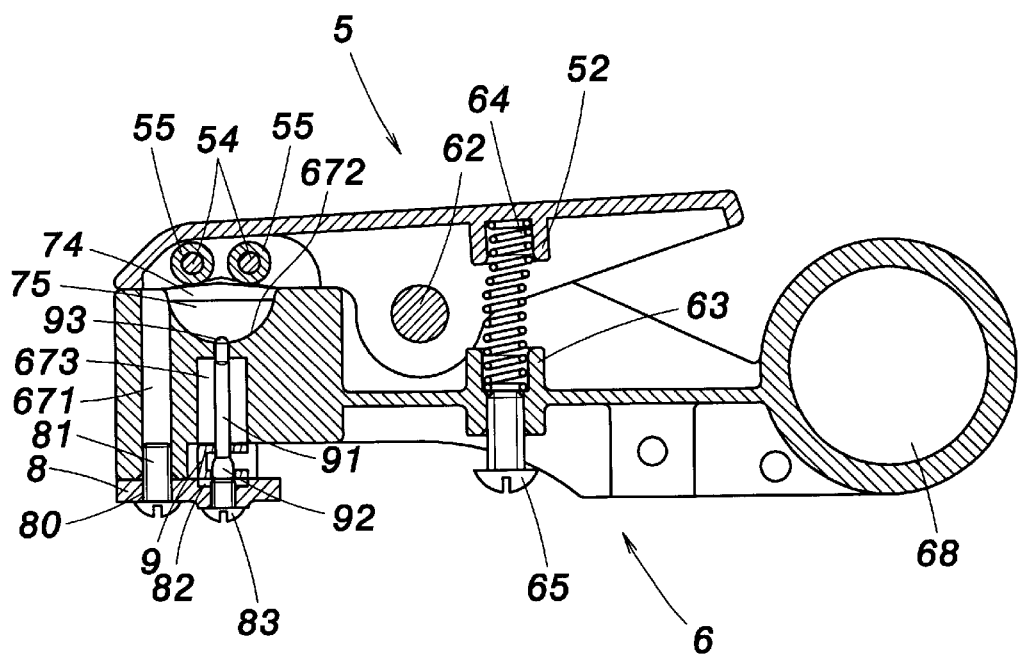
FIG. 5 is a side view of this invention.

The upper lid 5 has two sides bent into lug portions 50 with pivot holes 51 thereon. As best seen in FIG. 5, a cylindrical pole 52 protrudes from the inner surface of the upper lid 5. At the front end of the upper lid 5 there is provided a recess 53. In the recess 53, pivot pins 54 are installed. Each of the pivot pins 54 passes through a sleeve 55, which is located within the recess 53 for pressing the cable to be stripped.

The base 6 is disposed under the upper lid 5 with two sides bent into two sidewalls 60. Pivot holes 61 are disposed on the sidewalls 60. A main shaft 62 passes through the pivot holes 61 and the pivot holes 51 of the upper lid 5 to joint the upper lid 5 and the base 6 together. A cylindrical hole 63 is provided at the bottom within the sidewalls 60. A spring 64 is located in the cylindrical hole 64. The lower end of the spring 64 is connected with a screw 65 for adjusting the spring force. A screw 65 penetrates through the bottom of the base 6. The other end of the spring 64 inserts into the cylindrical pole 52 and abuts upon the upper lid 5, such that the front end of the base 6 and the front end of the upper lid 5 are in flexibly closed state. A blade seat part 66 and blade body part 67 are provided at the front end of the base 6. The blade seat part 66 comprises protruding rail 661, fixed hole 662 and elongate guiding hole 663. The blade body part 67 comprises fixed hole 671 and recess 672. At the lowest part of the recess 672 there is provided a blade hole 673. A finger hole 68 is provided at the rear end of the base 6.

The blade seat 7 is mounted on the blade seat part 66 of the base 6. Recessed groove 70 corresponding to the protruding rail 661 and a hole 71 corresponding to guiding hole 663 are formed at the bottom of the blade seat 7. A guiding pin 72 is movably installed in the guiding hole 663. The guiding pin 72 is fixed in the hole 71 to limit the sliding range of the blade seat 7 and prevent the blade seat from falling off. A recess 73 is provided on a top surface of the blade seat 7. Positioning piece 74 and blade 75 are installed on the recess 73. One end of the positioning piece 74 and one end of the blade 75 are fixed on the blade seat 7 by using a blade pin 76. The other end of the positioning piece 74 and the other end of the blade 75 are restrained by using slender pin 77.

The lower lid 8 is mounted at a bottom side of the front end of the base 6. Fixing holes 80 are provided thereon. The fixing holes 80 correspond to the fixing hole 662 provided on the blade seat part 66 at the front end of the base 6 and fixing hole 671 on the blade body part 67. Screws 81 are used to combine the lower lid 8 with the base 6. A blade body hole 82 is provided on the lower lid 8. The blade body hole 82 corresponds to the blade hole 673 provided on the blade body part 67 at the front end of the base 6. At the bottom of the blade body hole 82 there is a screw 83 for adjusting the depth of the blade body 91.

The blade rotation rod 9, which is like a U shape cubic object, is clipped between the base 6 and the lower lid 8. Within the blade rotation rod 9 a blade spring 90 is provided for restoring its position. The blade body 91 penetrates through one end of the blade rotation rod 9 that comprises an engaging block 92 at its bottom. The engaging block 92 is embedded into the blade rotation rod 9 and pivotally connected to the blade body hole 82 of the lower lid 8. The upper end of the blade body 91 is connected with the blade 93 that extends to the blade hole 673 on the blade bode part 67 at the front end of the base 6.

Figure 6:
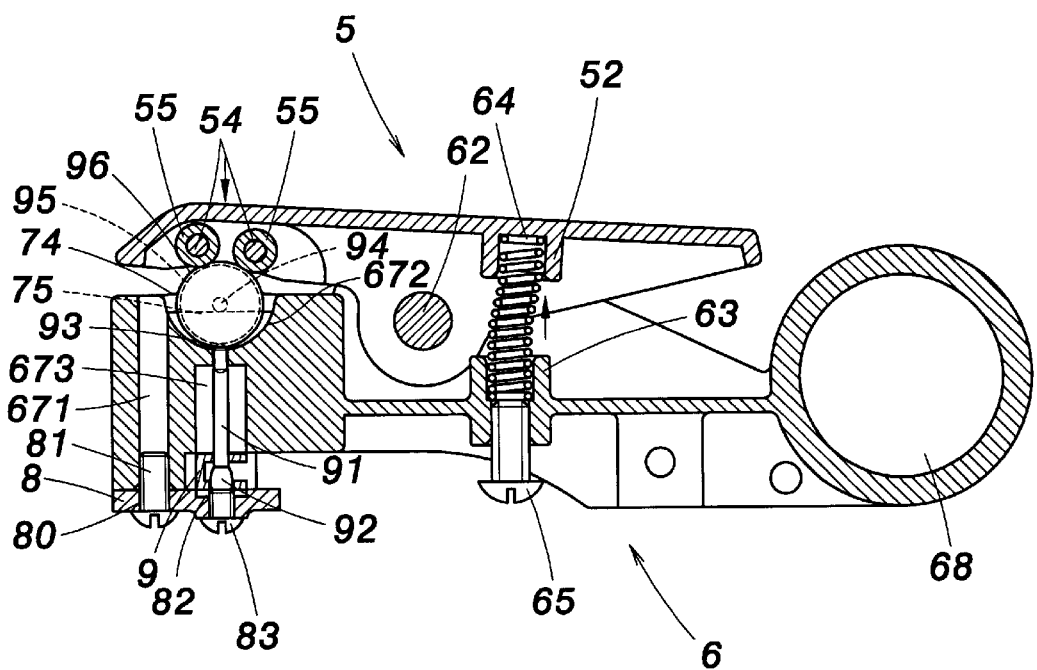
FIG. 6 and FIG. 7 are the stripping process of a cable according to this invention.
Figure 7:
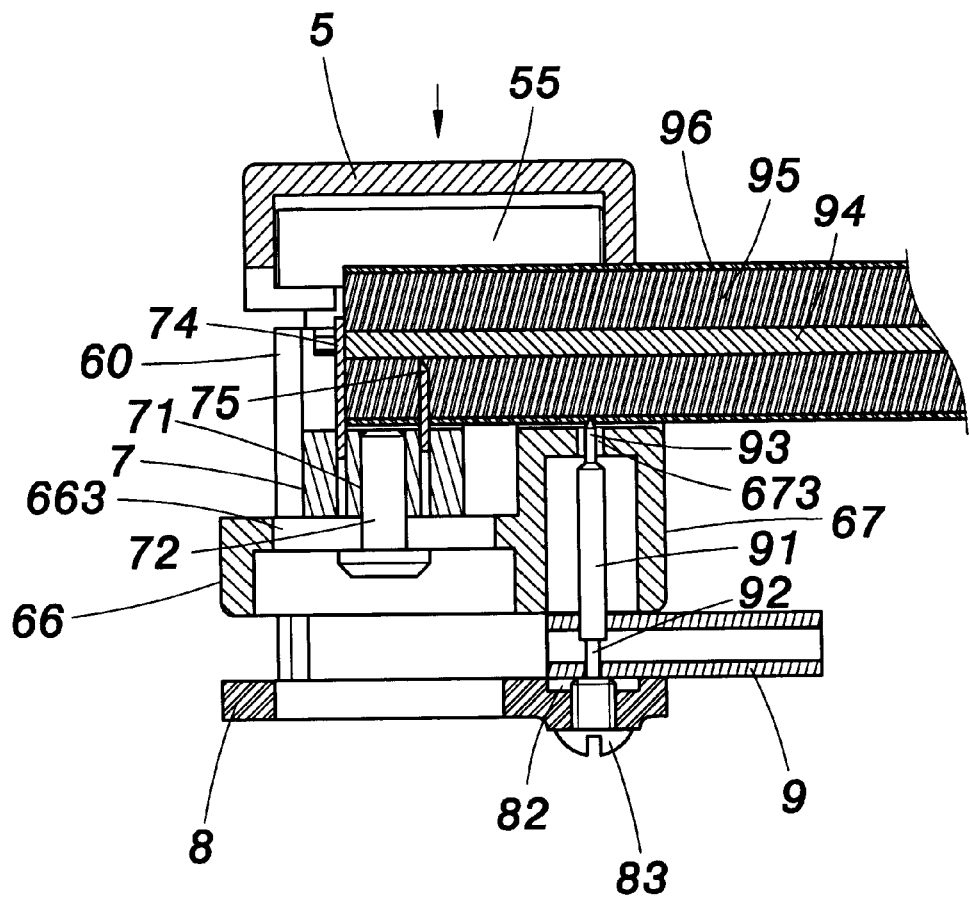

Referring to FIG. 6 and FIG. 7, the stripping process of a cable according to this invention is illustrated. In use, the user's finger presses the upper lid 5 to open the front end of the stripper. The cable is then placed on the recess 672 of the base 6. After reaching the positioning piece 74, the blade seat 7 is removed to a position the length of the insulation layer of the cable that is desired to strip off. Then, the upper lid 5 is released and the front end of the stripper close and grip the cable. Next, the screw 65 at the bottom of the base 6 is adjusted to control the spring force of the spring 64 so as to force the blade 75 to cut deep into the inner insulation layer 95 to the central conductive core 94. Next, the screw 83 at the blade body hole 82 is adjusted to control the cutting depth of the blade body 91 so as to force the blade 93 to cut into the outer sheath 96 of the cable. At this phase, the blade cutting direction is same as the radial direction of the cable. Next, the user's finger inserts into the finger hole 68 at the rear end of the base 6 and rotates the coaxial cable stripper. The inner insulation layer 95 and the outer sheath 96 are cut by blade 75 and blade 93 of the blade body 91.

Figure 8:
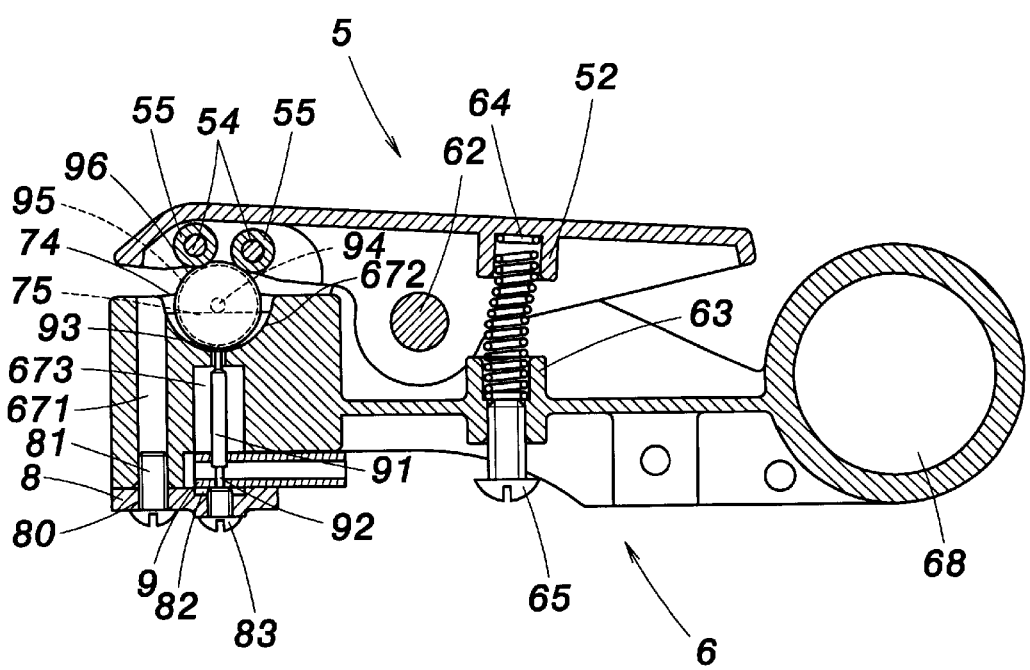
FIG. 8 and FIG. 9 the pulling out process of the cable according to this invention.
Figure 9:
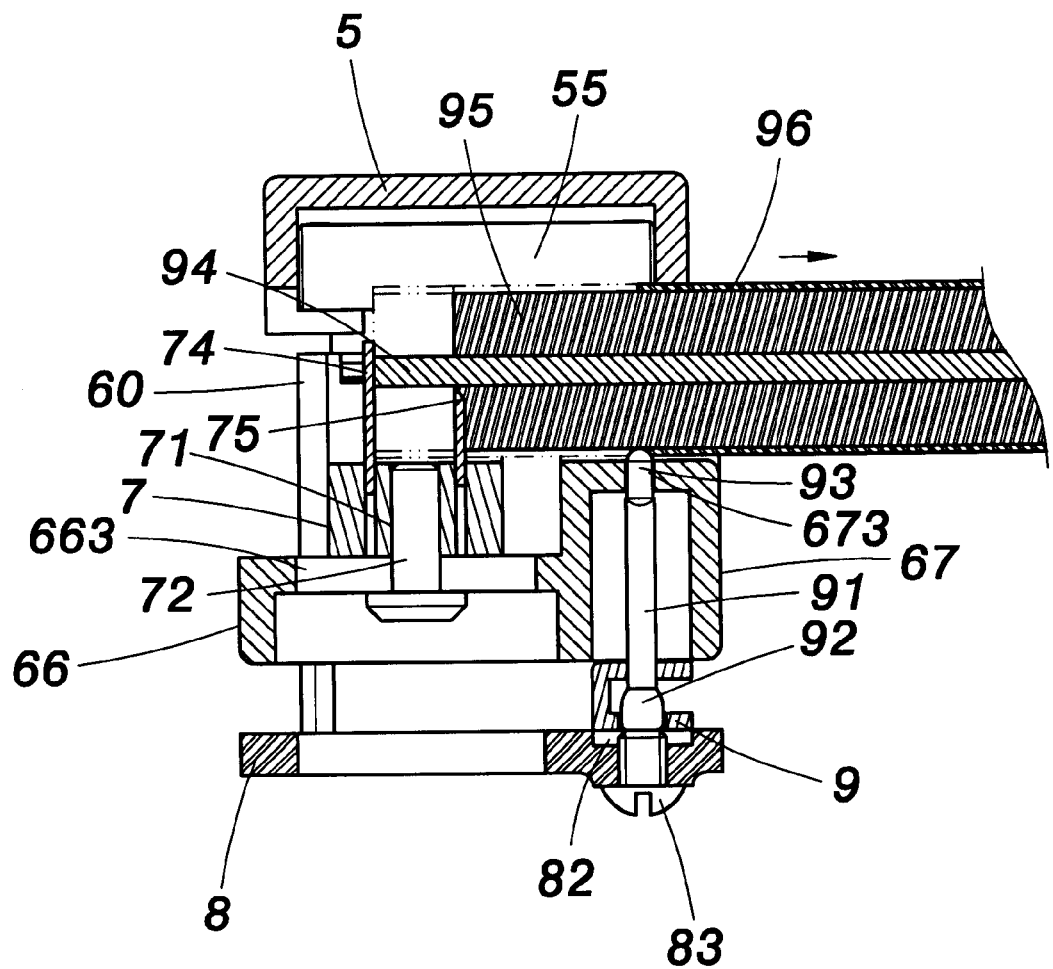

Referring to FIG. 8 and FIG. 9, the pulling out process of the cable according to this invention is illustrated. The blade rotation rod 9 is adjusted to move the blade body 91 so as to rotate the blade 93 for 90 degree. At this phase, the blade 93 is in parallel with the axial direction of the cable. Then, the cable is pulled out and the blade 93 cuts the outer sheath 96 along the length of the cable. The blade rotation rod 9 is then released and restored to its original position by the blade spring 90. At this phase, the inner insulation layer 95 at the front end of the cable is cut off by the blade 75.

To sum up, the present invention encompasses the following advantages:

(1) The screw at the bottom of the base is used to adjust the spring force of the spring to ensure sufficient blade cutting depth into the inner insulation layer of the cable.

(2) The blade is installed on a movable blade seat. A positioning piece is provided so that the cutting length can be adjusted in a pre-selected range.

(3) The screw at the bottom of the blade body hole of the lower lid is used to control the cutting depth of the blade body, thereby suited for various outer sheaths with different thickness.

(4) The blade rotation rod can do 90 degree rotation so that the blade can cut the out sheath in an axial direction and facilitates the removal of the outer sheath.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A coaxial cable stripper, comprising:
 an upper lid having a recess at its front end;
 a base pivotally connected with the upper lid, the base having a cylindrical pole protruding from inside sidewalls of the base, a spring being installed in the cylindrical pole, a screw being installed at the bottom of the spring, the screw being connected to the bottom of the base, the upper end of the spring abutting upon the upper lid so that the front ends of the base and the upper lid is closed, the front end of the base comprising a blade seat part and a blade body part, wherein at the top surface of the blade seat part there is provided a protruding rail, and at the top surface of the blade body part there is provided a recess having a blade hole thereon, and wherein the recess on the top surface of the blade body part corresponds to the recess on the upper lid;

a blade seat movably installed on the blade seat part of the base, the blade seat having a recessed groove at its bottom corresponding to the protruding rail on the blade seat part of the base, wherein a recess is provided on the top surface of the blade seat corresponding to the recess on the upper lid, and a positioning piece and a blade are installed thereon;

a lower lid connected to the front end of the base and having a blade body hole thereon, wherein a screw is disposed at the bottom of the blade body hole for adjusting the cutting depth of a blade body; and a blade rotation rod clipped between the base and the lower lid, one end of the blade rotation rod being connected with the blade body, which is connected to a second blade, wherein the second blade is inserted into the blade hole on the blade body part of the base, an engaging block is disposed at the bottom of the blade body, which is embedded into the blade rotation rod and pivotally connected with the blade body hole of the lower lid.

2. The coaxial cable stripper as claimed in claim 1 wherein pivot pins are installed at the front end of the upper lid, each of the pivot pins passes through a sleeve, which is located within the recess at the front end of the upper lid for pressing cable to be stripped.

3. The coaxial cable stripper as claimed in claim 1 wherein pivot holes are provided on the upper lid and the base, the upper lid and the base are pivotally joined together by using a main shaft.

4. The coaxial cable stripper as claimed in claim 1 wherein the upper lid has a cylindrical hole corresponding to the cylindrical pole at the base for installing the spring.

5. The coaxial cable stripper as claimed in claim 1 wherein the rear end of the base has a finger hole.

6. The coaxial cable stripper as claimed in claim 1 wherein the blade seat, the first blade, and the positioning piece are fixed by using a blade pin.

7. The coaxial cable stripper as claimed in claim 1 wherein the blade seat and the positioning piece are penetrated by a slender pin and the slender pin fixes the first blade.

8. The coaxial cable stripper as claimed in claim 1 wherein a guiding hole is provided on the blade seat part of the base, the blade seat part has a hole, a guiding pin is movably installed in the guiding hole and fixed in the hole.

9. The coaxial cable stripper as claimed in claim 1 wherein fixing holes are provided on the blade seat part and the blade body part of the base, the lower lid has fixing holes corresponding to the fixing holes on the blade seat part and the blade body part of the base, screws are used to combine the lower lid and the base.

10. The coaxial cable stripper as claimed in claim 1 wherein a blade spring is installed on the blade body for restoring the blade rotation rod.

* * * * *